United States Patent [19]

Meuret

[11] Patent Number: 4,583,932

[45] Date of Patent: Apr. 22, 1986

[54] ROTATIONAL MOULDING MACHINE

[75] Inventor: Paul V. Meuret, La Seyne-s/Mer, France

[73] Assignee: Societe a Responsabilite Limitee Datome, La Seyne-s/Mer, France

[21] Appl. No.: 715,179

[22] Filed: Mar. 22, 1985

[30] Foreign Application Priority Data

Apr. 6, 1984 [FR] France ............... 84 05605

[51] Int. Cl.⁴ .................. B29C 41/50; B29C 39/38
[52] U.S. Cl. ................... 425/182; 425/430; 425/434
[58] Field of Search ............ 425/429, 430, 435

[56] References Cited

U.S. PATENT DOCUMENTS

| | | | |
|---|---|---|---|
| 3,000,056 | 9/1961 | Parsch | 425/195 |
| 3,555,615 | 1/1971 | Orme | 425/435 |
| 3,609,814 | 10/1971 | Vox et al. | 425/435 |
| 3,692,457 | 9/1972 | Pekor | 425/435 |
| 3,734,665 | 5/1973 | Guillaud | 425/174 |
| 3,788,792 | 1/1974 | Suzuki | 425/430 |
| 3,796,533 | 3/1974 | Vox | 425/429 |
| 3,799,729 | 3/1974 | Hagen | 425/430 |
| 3,822,980 | 7/1974 | Graeper | 425/429 |
| 3,938,928 | 2/1975 | Andrews | 425/435 |
| 4,028,038 | 6/1977 | Haigh | 425/430 |
| 4,292,015 | 9/1981 | Hritz | 425/430 |

FOREIGN PATENT DOCUMENTS

| | | |
|---|---|---|
| 1779001 | 11/1971 | Fed. Rep. of Germany . |
| 2416818 | 10/1975 | Fed. Rep. of Germany ...... 425/429 |
| 1403000 | 5/1965 | France . |
| 1513460 | 2/1968 | France . |
| 1600351 | 8/1970 | France . |
| 2217696 | 9/1974 | France . |
| 553642 | 9/1974 | Switzerland . |

Primary Examiner—W. E. Hoag
Attorney, Agent, or Firm—Balogh, Osann, Kramer, Dvorak, Genova & Traub

[57] ABSTRACT

A rotational moulding machine comprising a heat-insulated enclosure mounted to rotate on a frame about a substantially horizontal axis, which enclosure comprises means for receiving and driving in rotation at least one mould about an axis perpendicular to the axis of rotation of the enclosure, wherein said enclosure further comprises, inside, radiating elements located in front of the walls of the enclosure whose radiations are reflected by reflector means towards the central part of the enclosure where the mould is located in order to heat said mould by radiation.

24 Claims, 8 Drawing Figures

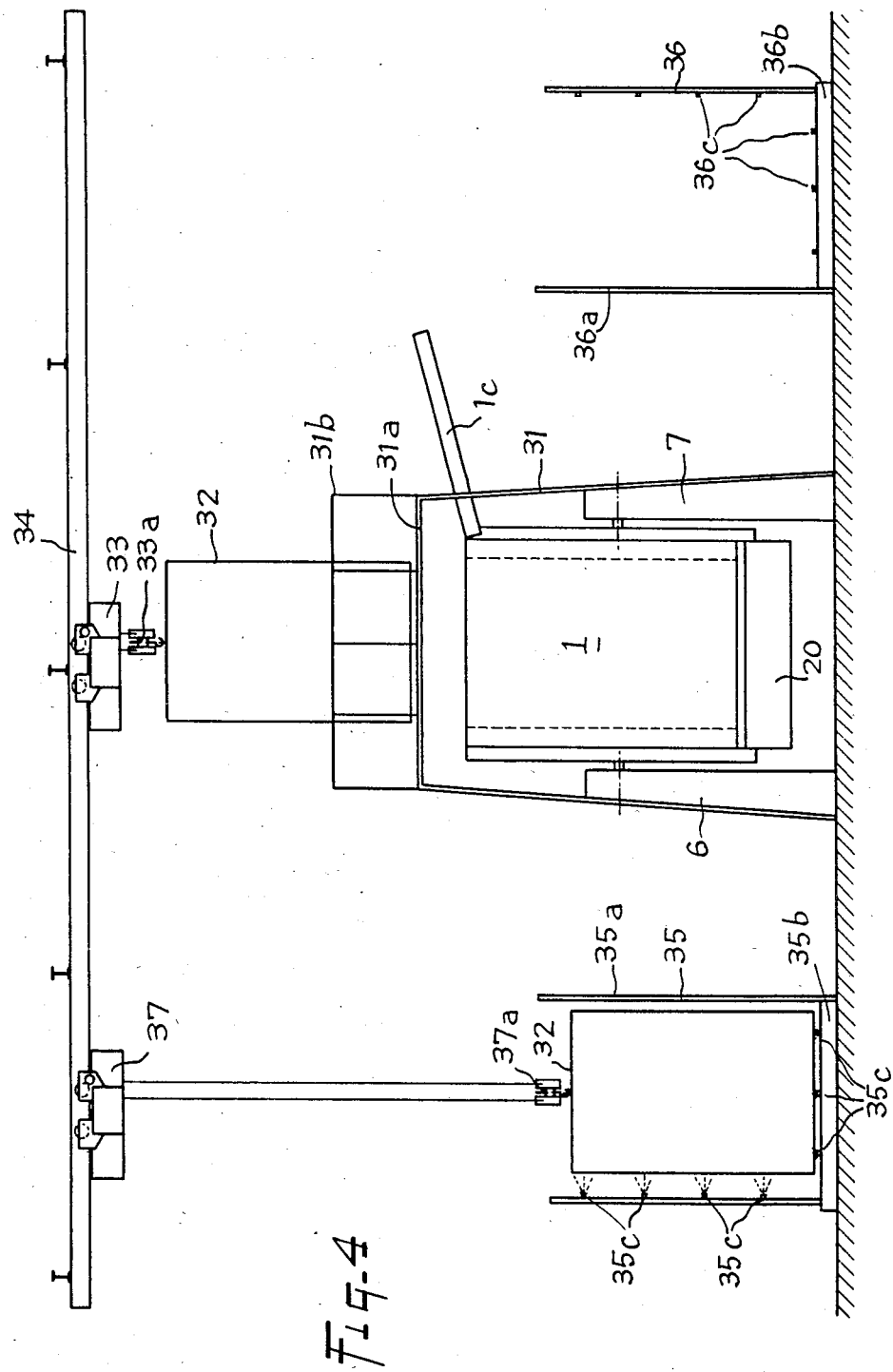

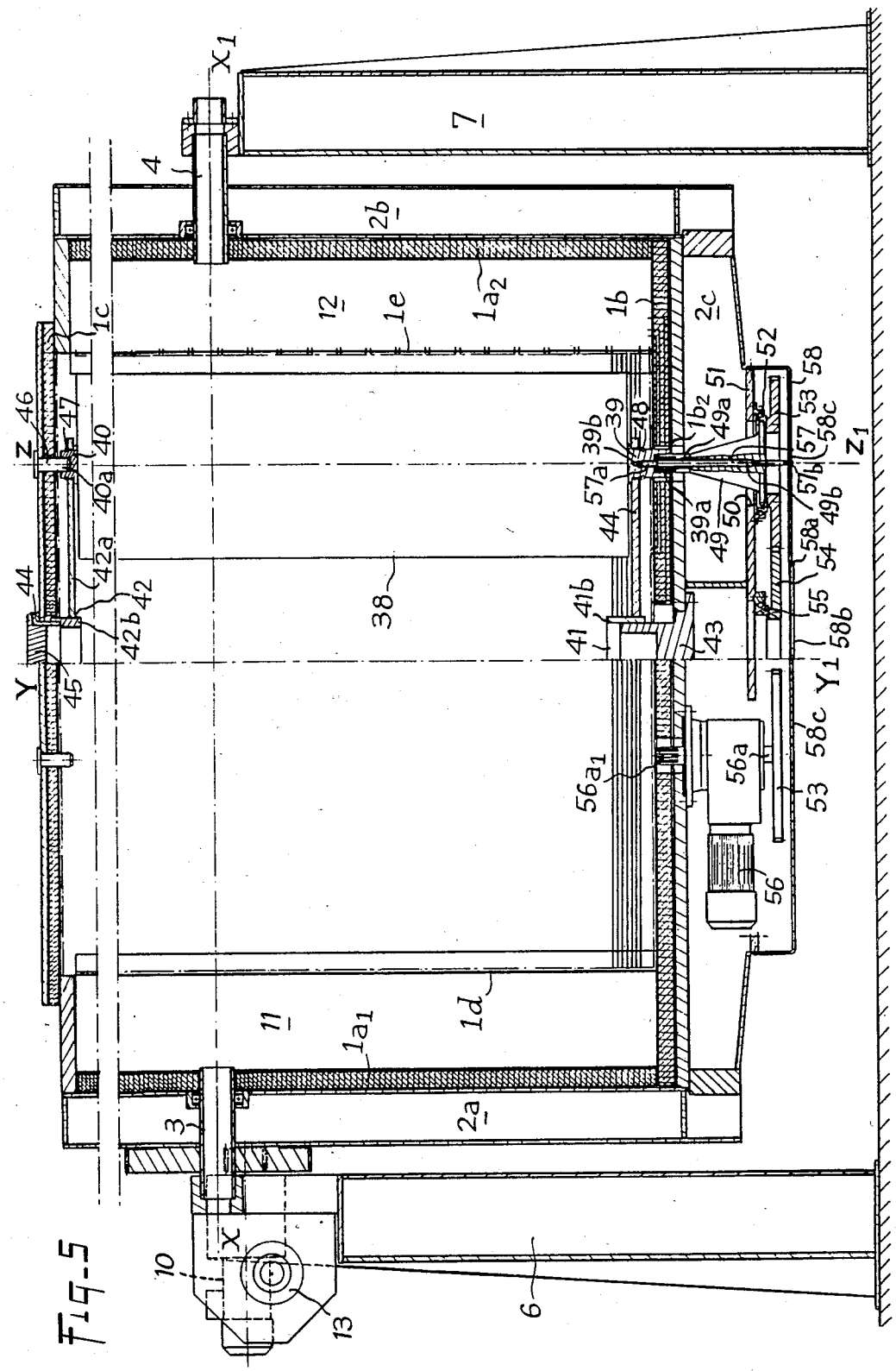

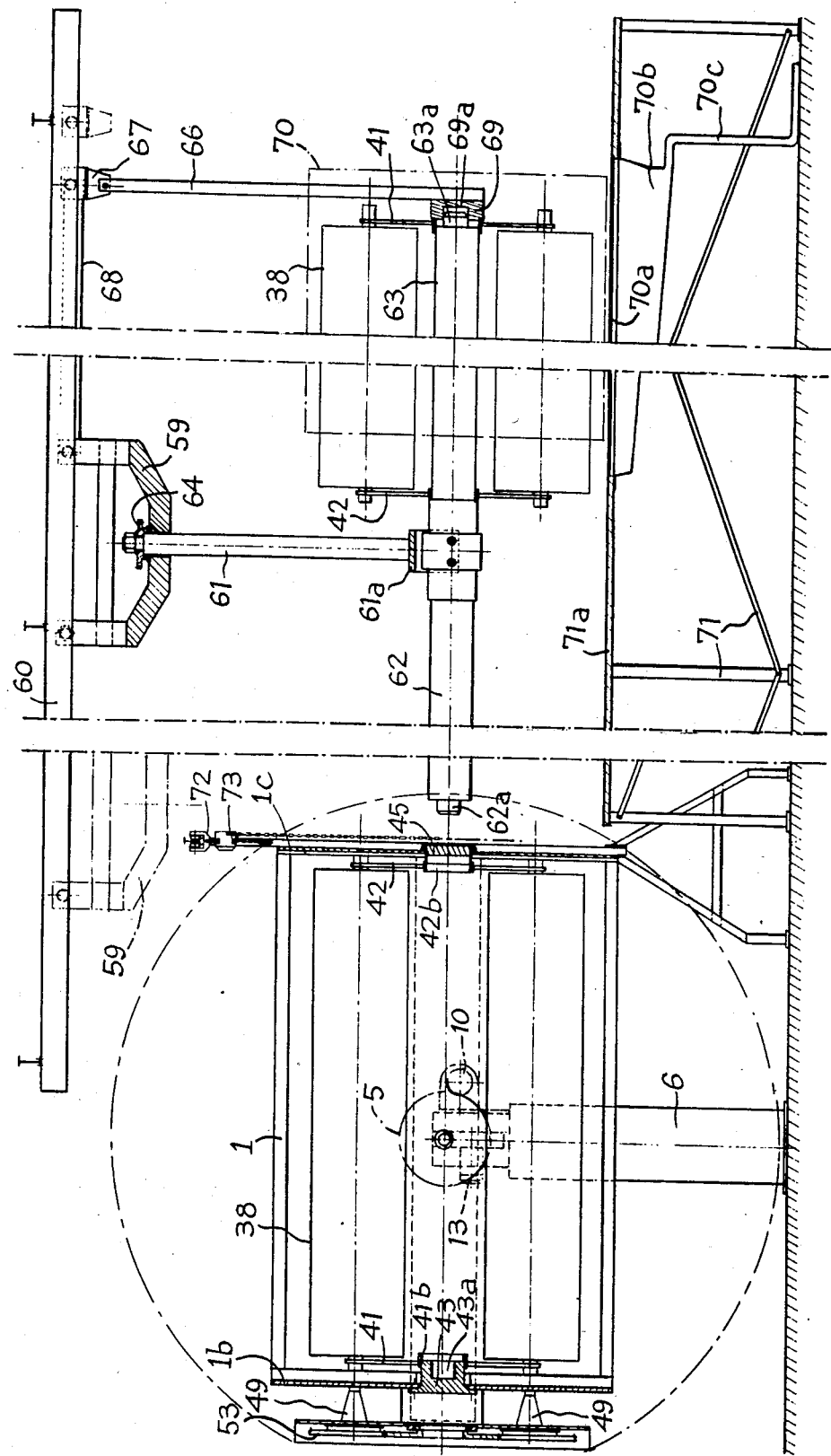

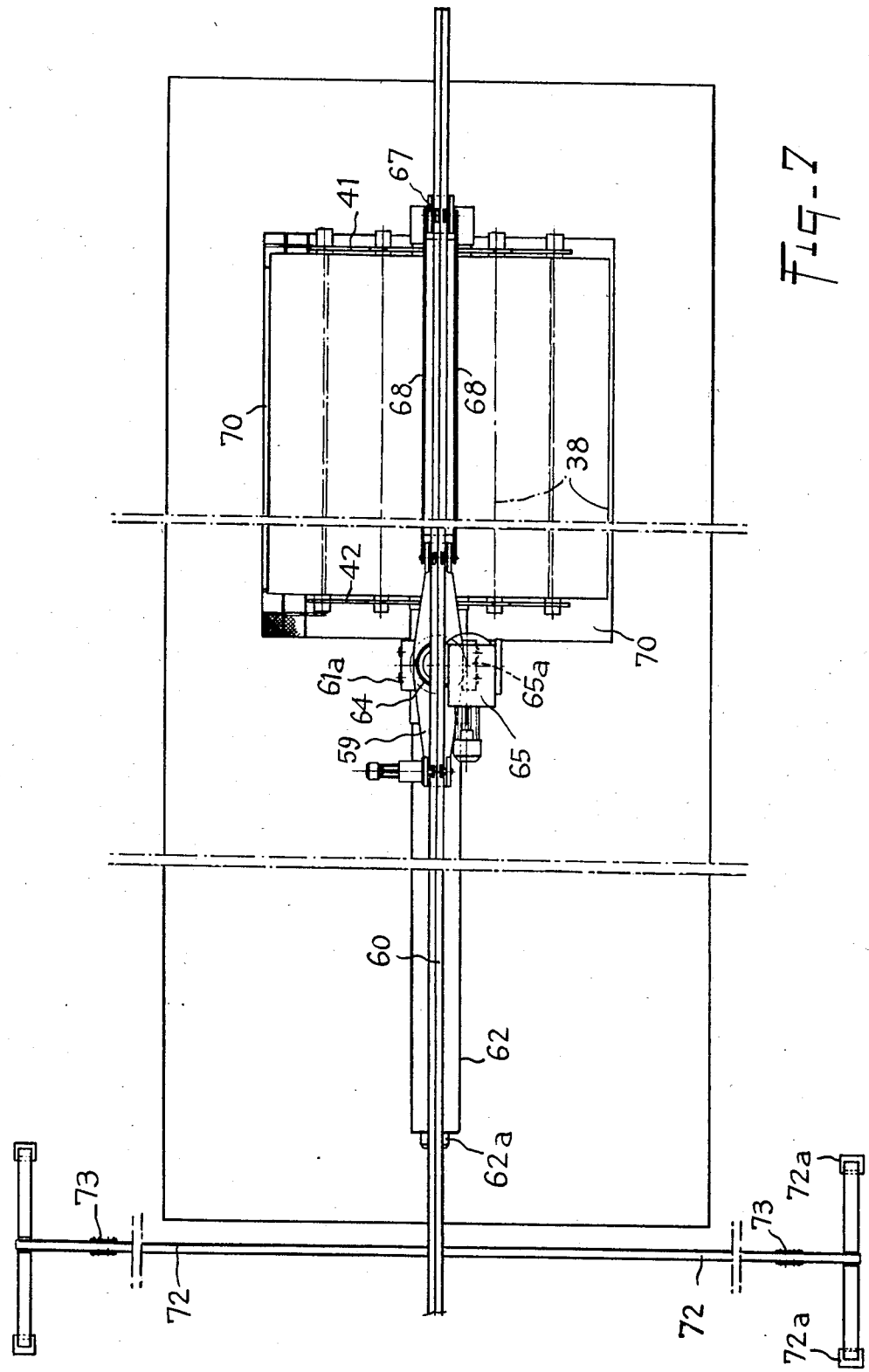

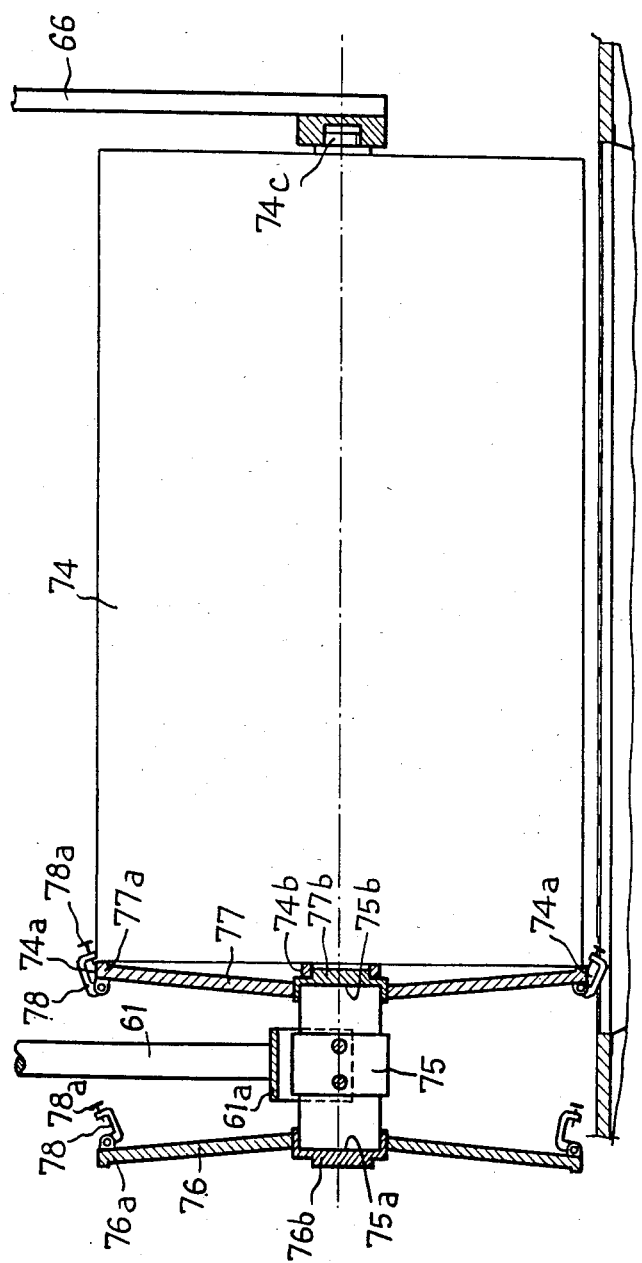

ROTATIONAL MOULDING MACHINE

The present invention relates to a rotational moulding machine.

The technical sector of the invention is that of apparatus and devices for making objects of plastics material by the process of rotational moulding.

As is known, according to this process, a metal mould in which a quantity of plastics material was previously introduced, is driven slowly in rotation about two perpendicular axes, for example at ten revolutions per minute; by heating the mould to a temperature of the order of 250° C. during the rotation, the plastics material adheres progressively to its inner wall until a piece is formed with a thickness corresponding to the quantity of basic product introduced into the mould. The deposit is firstly formed by semi-fusion of the product whilst the gelification which follows gives the cohesion of the manufactured product.

The mould is then cooled and the product demoulded by opening the mould.

The basic product is principally liquid polyvinyl chloride or polyethylene in powder form. A plurality of moulds may be mounted side by side on the same rotating system.

The technique of rotational moulding is particularly suitable for making pieces which cannot be made by the other, more widespread techniques, such as injection or blow moulding or for manufacturing pieces on a small or medium scale.

Several types of rotational moulding machines are known at the present time.

(a) Simple one-station machines comprising a system of rotation about two axes and of which heating of the mould is effected in the open air, for example by gas burner rails. These machines are the oldest known and are still used for moulding large pieces.

(b) Reciprocating machines and machines with multiple carriages. These machines comprise a single oven accessible to one or the other of two carriages located on either side which each bear a system of double rotation of the mould and present themselves successively in the oven. The oven saves energy, but the temperature drops when the doors of the oven are opened. Certain installations of this type comprise carriages each supporting the rotating system in overhang or above, in order to introduce it into the oven and then, by rolling, to present it to the cooling stations and to the loading/unloading stations. The principal movement of rotation may be a rocking lever movement, the secondary rotation is continuous.

These machines are especially used for large pieces.

(c) Carrousel machine with three or four stations. Numerous machines of this type are used at present. The principal applied in this type of machine is that of rotating a carrousel with three or four arms oriented at 120° or 90°, which bear at their ends a mechanism for driving the moulds. The arm rotates on itself whilst the other rotation is ensured by a shaft inside the arm. The two rotations are controlled by associated means of the carrousel or by motorizations particular to each arm. Rotation of the carrousel through 120° or 90° makes it possible to pass the moulds to the various stations installed on the periphery:
 loading/unloading in the open air;
 oven;
 cooling chamber employing air and/or atomized water.

In the case of the machine with four arms, it comprises a second cooling chamber as the duration of cooling is often longer than the duration of heating.

These machines are more especially suitable for pieces of small or average dimensions, as their size soon becomes excessive.

Machines or installations which combine the stations in different manners are also known. Such machines comprise four rotating arms serving the same oven in regular succession. Instead of being driven by a carrousel, these arms each serve the oven and a station outside the oven where cooling and demoulding take place.

(d) Machines using moulds with double walls between which hot then cold oil circulates. These machine necessitate expensive moulds and complex hydraulic installations and are virtually obsolete nowadays.

The machines at present available on the market present numerous specific drawbacks.

The most wide-spread machines of the carrousel type impose, by the simultaneous rotation of their arms, that the duration of heating be equal to that of cooling and to that of the loading/unloading operations. Now, this is far from being the case, particularly when the arms bear moulded products of different sizes.

These machines of the carrousel type also present drawbacks due to their design and structure, which renders them relatively fragile. Moreover, the rotation of the moulds creates a considerable spherical volume and requires an oven and a cooling chamber of large dimensions, further increased by their sector form to have available plane inlet and outlet openings, which is translated by large dimensions. The solution with four articulated arms mentioned above is more practical and more supple than the carrousel solution, but it does not eliminate the other drawbacks inherent in the arms: fragility, size, admissible load.

Other horizontal-axis machines which serve three stations: oven in the upper sector, loading and unloading at the bottom on the front part, cooling at the bottom and to the rear, are very complex and, being given the height available in a workshop, can be used only for making pieces of small volume.

Reciprocating machines and the like are more mechanical in their arrangement, but synchronism of the phases of manufacture is defective. In fact, the shift is still considerable between the duration of heating and that of cooling, to which is added the duration of the loading and unloading operations. The mechanism of rotation is located in overhang at the end of an arm, with all the drawbacks encountered in the carrousel type mentioned above.

Alignment of the stations is favourable but the dimensions in length are considerable due to the length of the carriages and the arms in overhang.

All these machines consume a great deal of energy, which is completely lost for heating the arms and the rotating systems for supplying the numerous necessary auxiliary devices for ventilation and driving, and energy which is lost from the oven via doors and walls.

Finally, the one-station machines, which are the oldest known, although very robust, have the major drawback of consuming more gas for heating, which, being effected in the open air, gives rise to an irregular distribution of the temperature detrimental to the process. However, such machines are at present used for manufacturing large pieces. One of these machines integrates a system of heating and cooling about the rotating moulds. The principal rotation takes place on rollers as for a cage winding and heating is obtained by forced convection as in the ovens of the carrousels and the reciprocating devices, by a circuit located outside.

In another one-station machine, the oven is fixed and the mould located inside the oven is subjected to a rocking movement and a continuous rotation. These modern one-station machines integrate the oven and a system of cooling by heat exchange but present drawbacks at the level of the mechanical part and the operational cycle sequences.

It is an object of the present invention to overcome these drawbacks.

One object of the invention is to provide a rotational moulding machine with one station where the or each mould is heated for moulding the pieces without excessive handling of the moulds, the machine also comprising a pre-cooling incorporated therein, the final cooling possibly being effected in conventional manner outside the enclosure. The thermal cycle required is therefore effected at the same station.

A further object is to effect heating by means incorporated in a rotating enclosure, these means regulating the heating at points over the length of the mould as a function of the pieces to be made and of the shape of the moulds, and they save energy in heating and in ventilation.

A further object of the invention is to provide the machine with auxiliary means facilitating loading/unloading with a view to making best possible use of a rotational moulding workshop and obtaining products of good quality at competitive prices.

These objects are attained by the machine according to the invention comprising a heat-insulated enclosure mounted to rotate on a frame about a substantially horizontal axis, which enclosure comprises means for receiving and driving in rotation at least one mould about an axis perpendicular to the axis of rotation of the enclosure, in which said enclosure further comprises, inside, radiating elements located in front of the walls of the enclosure whose radiations are reflected by the reflector means towards the central part of the enclosure where the mould is located in order to heat said mould by radiation.

The radiating elements are distributed on the one hand over the height of the enclosure and in front of the inner faces of the side walls and, on the other hand, said elements are distributed in front of the inner faces of the bottom and cover of said enclosure.

In one embodiment, the machine comprises a plurality of assemblies of radiating elements distributed on the inner periphery of the enclosure, which assemblies are superposed to cover the height of the enclosure and each comprise means for controlling the heating in order to modulate the latter over the height of the enclosure. The latter is mounted to rotate about two parts of a hollow shaft which are coaxial and substantially horizontal and the enclosure is of polygonal cross section and comprises, at its lateral ends where said shaft parts are located, two boxes defined by the side walls of the enclosure and by two reflecting walls parallel to each other and to the axis of rotation of the mould, said walls extend over the height of the location of the mould, comprise a plurality of openings for the passage of the air for cooling the mould, which air is admitted cold into one of the boxes via one of said shaft parts, is distributed over the height of the location of the mould by the perforated wall of said box and is collected in the other box after having passed over the mould to be evacuated hot by the other shaft part. The mould is mounted on a plate driven in rotation in the lower part of the enclosure, which plate is perforated and moves in rotation above said radiating elements which are distributed on the bottom of the enclosure. The plate is preferably composed of a plurality of radial arms extending from a central hub mounted to rotate in the bottom of the enclosure, which arms are connected to one another by connecting bars tangential to a theoretical circle concentric to said hub.

The mould is constituted by two half-shells and comprises locking members for connecting it to the plate, which members are actuated from outside the enclosure by means of a key passed in at least one opening reserved in the bottom of the enclosure.

In a machine of which the enclosure is adapted to receive a plurality of moulds equidistant from its centre, the enclosure comprises, in its lower part, shafts passed in orifices reserved in its bottom, which shafts are equidistant from the centre of the enclosure and comprise connecting means for cooperating with means for driving the moulds in rotation, which shafts are subjected to drive means located outside the enclosure.

The moulds are mounted between two star-shaped supports of which the radial arms of one support are parallel to the radial arms of the other and comprise, at their free end, a circular orifice for receiving a journal and to allow rotation of the moulds, each of the moulds being borne by two arms, which journals are maintained in translation by means which prevent the supports from escaping from the journals. The radial arms of each of the two supports extend from a central hub.

For loading an assembly of moulds, the machine comprises loading means comprising an aerial carriage which comprises a column extending downwardly in a substantially vertical position and mounted to rotate about its longitudinal axis at the free end of which are fixed two spindles extending in opposition and perpendicularly to the column, which spindles are placed in a position substantially coaxial to the enclosure immobilized in substantially horizontal position. Each assembly of moulds is borne by one of said spindles, which is engaged in the hubs of the mould supports and the carriage comprises means for being displaced in the axis of the enclosure thus immobilized to place an assembly of moulds in the enclosure or to withdraw said assembly therefrom.

For loading a mould of large dimensions, the machine comprises an aerial carriage which comprises a column extending downwardly in a substantially vertical position and mounted to rotate about its longitudinal axis, at the free end of which are mounted two mould supports located on either side of the column, which supports comprise radial arms, which arms of the two supports diverge slightly in two's from a central mandrel with respect to the column and their free ends are located in planes parallel to one another and to the column and comprise at said ends means for fixing the mould placed in abutment on a projecting shoulder reserved at the upper edge of the mould, said supports further comprising means for centering the mould.

Said machine further comprises a suspension arm mounted to roll on the running rail of the carriage of which the free end of the arm is located at the level of the spindles or the central mandrel of the supports and comprises a cylindrical housing for receiving a journal coaxial to the hub of one of the supports of an assembly of moulds or of one mould, to support the load borne by one of the spindles or one of the supports fixed to the column when the other spindle or the other support is unloaded.

Said machine further comprises a gantry disposed in front of the entrance of the enclosure in horizontal position and perpendicularly to the longitudinal axis thereof, which gantry comprises two pulley blocks guided along its top crosspiece, which pulley blocks comprise means for hooking on the cover of the enclosure which is in two parts in order to retract laterally on either side of said enclosure.

In another embodiment, the machine comprises loading means comprising two aerial carriages rolling on a rail located above the enclosure, so that, when it is immobilized in substantially vertical position, the rail extends above the centre of the enclosure, which comprises, on either side, a station for cooling the moulds by atomization of water.

Said carriages operate in reciprocating manner so that, whilst one mould is in cooling phase, another is in heating phase. Said carriages comprise means for driving the moulds in rotation about their longitudinal axis to cause them to rotate in front of the water spray bars fixedly mounted in the cooling stations.

The result of the invention is a rotational moulding machine with a single station in which one or more moulds are heated by radiation in an enclosure mounted to rotate about two perpendicular axes, which machine is provided with loading/unloading means with a view to facilitating handling of the moulds during manufacture.

The machine according to the invention is robust and reliable due to its design and manufacture from simple mechanical members. Its capacity is high for reduced overall dimensions. It is economical being given the efficiency of direct electrical heating by radiation limited virtually to the mould and which, in addition, makes it possible to obtain homogeneity of the temperatures during heating and also during cooling, and thus products of high quality.

This machine has a wide range of speeds and temperatures available, which makes it possible to obtain excellent performances and high rates for a slow process. As it comprises one single station where the operations are carried out one after the other, several machines may occupy the room which would be necessary for one of the machines, of the carrousel type, currently used. The machines according to the invention may be operated by one operator.

The invention will be more readily understood on reading the following description with reference to the accompanying drawings, in which:

FIG. 4 is a view in elevation of a machine according to the invention provided with loading/unloading means of the riciprocating type and comprising two cooling stations employing atomization of water.

FIG. 5 is a view in transverse section of a machine according to the invention equipped with means for driving a plurality of moulds in rotation, which are connected to form an assembly easy to handle.

FIG. 6 is a view in elevation of a machine immobilized in horizontal position in front of a loading/unloading device with horizontal displacement.

FIG. 7 is a plan view of the whole of the machine illustrated in FIG. 6 of which one enclosure is shown immobilized in vertical position.

FIG. 8 is a view in elevation of a loading/unloading device similar to the one illustrated in FIG. 6, but comprising means for maintaining, each, a mould of large dimensions.

Figure 1:
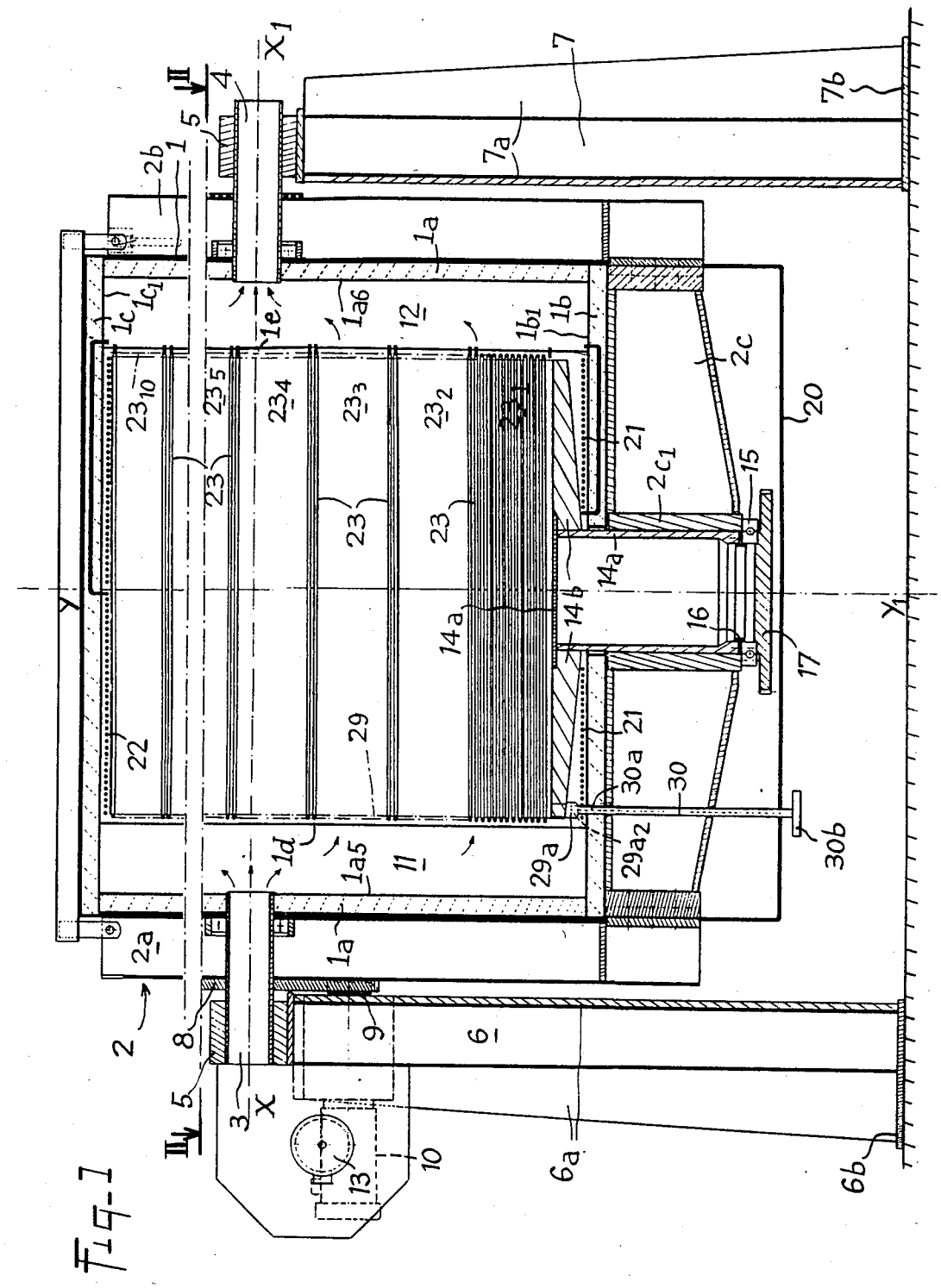
FIG. 1 is a view in transverse section of a machine according to the invention.
Figure 2:
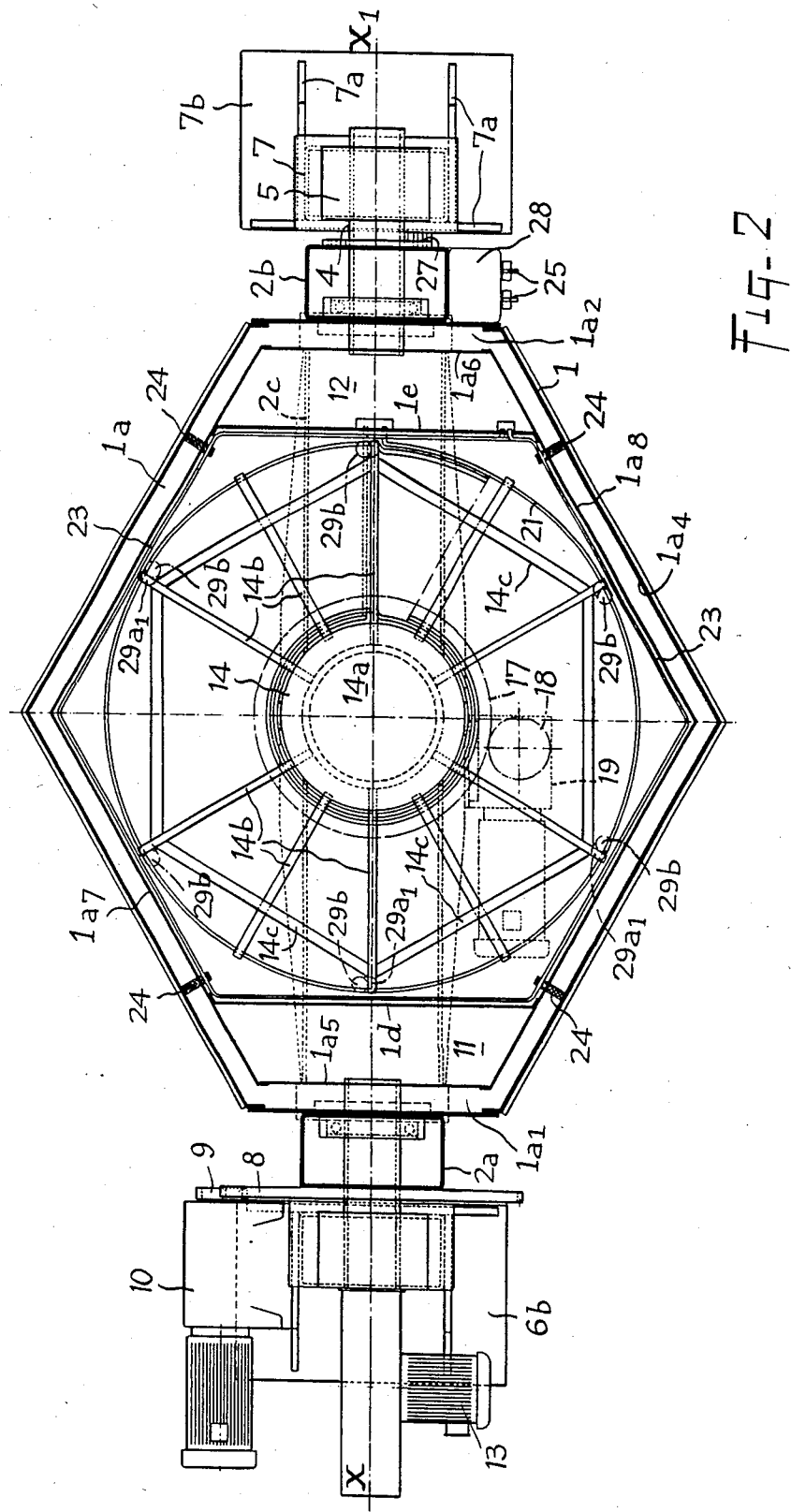
FIG. 2 is a view in section along line II—II of FIG. 1.
Figure 3:
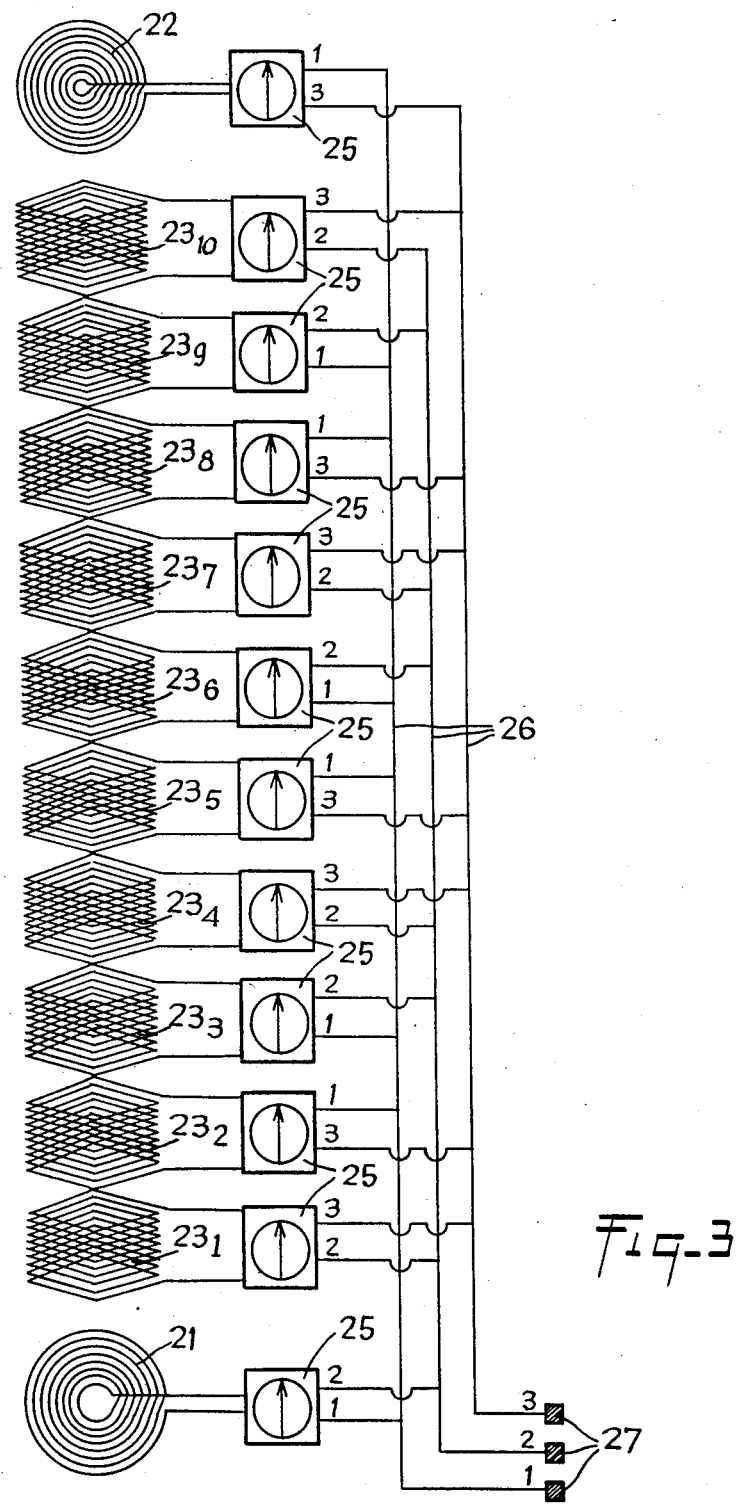
FIG. 3 is a schematic view in perspective illustrating the assemblies of radiating elements and their controls.

Reference will firstly be made to FIGS. 1 to 3 of the drawings.

The machine according to the invention comprises an enclosure 1 adapted to receive one or more moulds, which enclosure is of hexagonal cross section and comprises side walls $1a$, a bottom $1b$ and a cover $1c$ articulated on the side wall, which are constituted by double heat-insulated walls.

The enclosure 1 is mounted on a U-support 2 comprising two lateral tubular uprights $2a/2b$, of rectangular cross section and a mechanically welded crosspiece $2c$ which is in contact with the bottom $1b$ of the enclosure. The lateral uprights extend over the height of the enclosure and are located at the centre of the end walls $1a_1/1a_2$ thereof.

As shown in FIG. 2, the enclosure is symmetrical with respect to an axis xxl lying in a plane perpendicular to bottom 1b, which axis xxl is also the axis of rotation of the enclosure. It comprises two coaxial hollow shafts 3/4, aligned on the axis of rotation xxl. These shafts open out in the enclosure, are perpendicular to the end walls $1a_1/1a_2$ and are substantially located half way up the enclosure, with the result that the axis xx passes through the centre of gravity thereof. The shafts 3/4 are fitted in supports 5, fixed at the upper end of two uprights 6/7 anchored in the ground and constituting the frame of the machine. For example, these uprights are tubes of rectangular cross section reinforced by webs $6a/7a$ to withstand the static and dynamic stresses of the enclosure when rotating, the tubes and webs being fixed to base plates $6b/7b$. The upright 2 comprises a toothed ring 8 which cooperates with a pinion 9 fitted on the driven shaft of a gear motor 10 fixed to the upright 6. This gear motor drives enclosure 1 in continuous rotation about axis xxl. The enclosure comprises two half-shells $1a_3/1a_4$ formed by two identical walls intersecting on a line extending over the height of the enclosure, which half-shells are identical and are fixed to said end walls $1a_1/1a_2$. The inner plates $1a_7/1a_8$ of the double wall of the half-shells $1a_3 1a_4$ and of the end walls $1a_1/1a_2$ constitute reflectors and are for example made of stainless steel. The inner plates $1b_1/1c_1$ of the double wall constituting the bottom and the cover are also reflecting and are for example made of stainless steel.

The enclosure comprises, in its inner part, two walls $1d/1e$ parallel to each other and to the end walls $1a_1/1a_2$. These walls $1d/1e$ constitute reflectors for example made of stainless steel and are fixed to the inner plates of the half-shells $1a_7/1a_8$. Their arrangement is such that the central volume of the enclosure is of regular hexagonal cross section. The two walls $1d/1e$ comprise a plurality of orifices distributed over their surface so as to ensure circulation of air in said central volume in which the or each mould is disposed. These walls $1d/1e$ define with the other walls of the enclosure two boxes 11/12 at the lateral ends of the enclosure. A ventilator 13 is connected to the hollow shaft 3 and is fixed to the upright 6 which supports the enclosure. The air circulated by the ventilator 13 and circulating in the direction of the arrows is firstly admitted into box 11, is distributed therein, passes through the orifices of wall 1$d$, circulates in the central volume and around the mould, passes through the orifices of the wall 1$e$ and is collected in the box 12 and evacuated through the other hollow shaft 4.

The central volume of the enclosure comprises, on the bottom 1$b$ side, a plate 14 mounted to rotate on the central axis yy1 of the enclosure and comprising a central hub 14$a$ of large diameter, for example hollow, which is engaged in a cylindrical sleeve 2$c_1$ which extends through the crosspiece 2$c$ of the U-support 2. The central hub 14$a$ is closed in its part located towards said volume and is fixed, by its other end, to a ball or roller bearing 15, itself fixed, by its housing, to the crosspiece 2$c$. A heat insulating means in the form of a washer 16 is inserted between the hub 14$a$ and the bearing 15 in order to avoid heating the bearing by conduction. A ring 17 for driving the plate 14 is fixed to the hub 14$a$ and cooperates by its toothing with a pinion 18 fitted on the driven shaft of a gear motor 19 fixed to the lower part of the crosspiece. The plate 14 comprises several radial arms 14$b$, for example ten in number, which extend from the central hub 14$a$ up to the vicinity of the inner reflectors 1$d$/1$e$/1$a_7$/1$a_8$. These arms 14$b$ are connected together by connecting bars 14$c$, which are tangential to a theoretical circle concentric to the hub 14$a$. For example, the radial arms 14$b$ extend outside the polygon formed by said connecting bars, which form a regular hexagon. The plate 14 is adapted to support one of more moulds, which are driven in rotation about axis yy1 under the effect of the gear motor 19. A housing 20 covers the members located in the lower part of the enclosure.

The central volume of the enclosure comprises heating elements distributed over the bottom 1$b$, the cover 1$c$ and the lateral walls of said volume 1$d$/1$e$/1$a_7$/1$a_8$. Said elements are radiating elements, preferably electrical resistances. The radiating elements which cover the bottom 1$b$ and the cover 1$c$, 21/22 are wound helically and are distributed over virtualy the whole of their surface. The elements 21 occupy the surface included between the hub 14$a$ and the lateral walls of the enclosure and are disposed between the bottom 1$b$ and the plate 14. The radiating elements 23, which are distributed over the height and on the inner periphery of the volume of the enclosure, are located in planes which are substantially parallel to one another and perpendicular to axis yy1. They form turns of a hexagonal contour and are fixed in front of reflectors 1$d$/1$e$/1$a_7$/1$a_8$ on insulating bars 24 and thus surround the mould which is fixed to the perforated plate 14.

As shown in the drawing, the resistances 23 are preferably grouped together in a plurality of assemblies 23$_1$/23$_2$ . . . 23$_{10}$ distributed over the height of the inner volume of the enclosure. FIG. 3 schematically illustrates the supply of said assemblies 23$_1$ to 23$_{10}$ and also of the bottom elements 21 and the covers 22. Each assembly 23$_1$ to 23$_{10}$ and those 21 and 22 comprises a switch-on bottom 25 associated with a time-switch for regulating the duration of supply. Said elements are mounted in known manner in shunt on a three-phase circuit 26 terminating in a rotating commutator 27. The buttons 25 and their time-switch are mounted in a casing 28 fixed to the upright 2$b$ of the U-support 2 and in which casing the electrical network for heating by radiation terminates.

The mould 29, shown in chain-dotted lines in FIG. 1, is disposed inside the heating resistances which envelope it on all sides. It is fixed to the plate 14 by means of locking members 29$a$ mounted to rotate through a quarter turn for example in the lower part of the mould. As shown in FIG. 2, the mould may comprise six members 29$a$ disposed near the peripheral wall of the mould and placed on the side of certain radial arms 14$b$.

Each locking member comprises a projecting part 29$a_1$ which is placed by rotation through a quarter turn of the lock 29 below the radial arms 14$b$. Coaxially to its axis of rotation, each lock comprises a housing 29$a_2$ forming faces, for example four faces, in which housing is engaged a control key 30 whose end 30$a$ is of square cross section in order to cooperate with said housing. At its other end, the key comprises a gripping member 30$b$ which, when the locks are manoeuvred, lies outside the casing 20. This key is passed into orifices reserved in the casing, the crosspiece 2$c$ and the bottom of the enclosure 1$b$ to have access to the locking members. The or each mould is heated by radiation of the electrical conductors. These latter being disposed in front of reflectors 1$b_1$/1$c_1$/1$d$/1$e$/1$a_7$/1$a_8$, the radiation directed towards the rear of the conductors is reflected on the pieces in rotation, which gives a very good output. The power of heating is selected and distributed by switching of various or of all the assemblies of elements 23$_1$ . . . 23$_{10}$/21/22 by acting on switches 26.

Taking into account the heating means obtained: the radiation, the heat is directly transferred into the mould, contrary to the forced convection usually used which is penalized by a low exhange coefficient.

A first cooling of the or each mould is obtained by air circulation, as has already been set forth hereinabove. Rotation of the moulds further promotes the uniform distribution of the temperatures. The use of a closed enclosure which closely circumscribes the moulds, makes it possible to obtain high speeds of air circulation without a prohibitive flowrate. For certain manufactures, it is necessary to terminate cooling of the moulds by atomization of water. The machine thus comprises two cooling stations which are disposed on either side of the enclosure. An example of installation of this type is illustrated in FIG. 4 of the accompanying drawings.

The enclosure 1 mounted to rotate on its frame 6/7 is placed in a framework 31 and below a work platform 31$a$ defined by a safety rail 31$b$. The platform comprises a central trap through which is passed the or each mould 32. In the Figure, the enclosure 1 is shown immobilized in vertical position with its cover 1$c$ open. The mould 32 is borne by a carriage 33 rolling on a rail 34 located above the enclosure and extending horizontally above the centre thereof. In the axis of the rail 34, the enclosure 1 comprises on either side two cooling stations 35/36 separated from the enclosure by the same distance. The rail 34 is of sufficient length for the carriage 33 to be able to present the mould 32 level with station 36. The device is of the reciprocating type and comprises a second carriage 37 which moves on the rail 34 to serve station 35. Each station is composed of a peripheral wall 35$a$/36$a$ and of a receiving and flow tank 35$b$/36$b$. Water diffusers 35$c$/36$c$ are distributed on the side of the station and at the bottom thereof to atomize water on a mould 32. The two carriages 33/37 comprise a pulley block 37$a$ of known type and comprising means for driving the mould 32 in rotation about its longitudinal axis so as to atomize the water on its side wall. The design of the installation makes it possible, thanks to the two carriages 33/37, to manufacture continuously by proceeding with moulding in the central enclosure and by alternately using one and the other complementary cooling station 35/36.

FIG. 5 shows a machine according to the invention of which the enclosure is adapted to receive a plurality of moulds 38, which are driven in rotation about their longitudinal axis zzl. The general design of the enclosure and its frame are similar to those of the machine described with reference to FIG. 1. The main differences lie in the organization of the assembly of the moulds 38 and of their rotation. For example, the enclosure may receive six moulds 38 equidistant from the central axis yyl of the inner volume of the enclosure in which the radiating elements 21/22/23 are installed. Each mould further comprises, at its end located towards the oven 1b, a journal 39 and at the opposite end another journal 40. These journals 39/40 are placed in circular orifices reserved at the end of the arms 41a/42a of a star-shaped support 41/42. These supports 41/42 comprise a central hub 41b/42b, for example a part of a tube, from which hub said arms 41a/42a extend. The arms which are connected to one of the hubs are all in the same plane and all the arms are of the same length. A support 42 is shown in FIG. 7 of the drawings. Each mould 38 is thus mounted between two arms 41a/42a, which are parallel to each other. The hub 41b is mounted about a central shaft 43 fixed to the bottom 1b of the enclosure. The hub 42b is mounted about another central shaft 44 fixed to the cover 1c. A stopper 45 is engaged in shaft 44.

Each journal 40 comprises a cylindrical housing 40a in which is engaged a removable shaft 46. The shafts 46 are preferably connected on the same mount, and may be maintained or removed together. Each journal 40 comprises a peripheral groove 40b located outside and in the vicinity of the arms 42a, in which groove is placed a clip 47. These clips maintain in translation the relative position of the journals 40 and the arms 42a. Each journal 39 also comprises a peripheral groove 39a located outside and in the vicinity of the arms 41a. This groove receives, in the same way as for the journal 40, a clip 48 to avoid the arms 41a escaping from journals 39. The latter are passed in orifices 1b₂ reserved in the bottom 1b of the enclosure and comprise at their free end a female fluted orifice 39a in which penetrates the male fluted end of a shaft 49 which adopts, as illustrated in FIG. 5, the form of a rocket. The shaft 49 is passed in an orifice 50 made in a support 51 fixed to the crosspiece 2c and is mounted to rotate on a thrust ball or roller bearing 52, fixed by its cage to said crosspiece 2c. The shaft 49 comprises, at its end opposite the one which comprises the flutings, a toothed wheel 53, of which the toothing meshes with that of a central ring 54 mounted to rotate freely on a ball or roller bearing 55 fixed to said support 51. The arrangement of the toothed wheels 53 is such that they mesh with the central ring 54, without, however, cooperating together. This assembly of wheels 53/54 is driven by a gear motor 56 whose driven shaft 56a extends on either side of the reduction gear and is fluted at one of its ends 56a₁ to cooperate with a female fluted journal 39 and comprises at its other end a toothed wheel 53 fitted on the shaft 56a.

Each of the shaft 49 and shaft 56a of the gear motor comprise, at their centre, a conduit 49b extending over the whole of its length.

In this conduit 49b is engaged a rod 57, threaded at its end 57a in order to be screwed in a tapped housing 39b reserved at the centre of the journal 39. These threaded rods 57 ensure connection of the moulds 38 and the shafts 49/52a. They comprise at their end opposite the one which is threaded, gripping means for screwing or unscrewing. These means consist for example of a hexagon socket 57b and a corresponding spanner. The assembly of the wheels 53 and the gear motor 56 is protected by a casing 58 fixed to the lower part of the enclosure. The casing comprises an inspection port 58a, concealed by a removable door 58b and orifices 58c giving access to rods 57.

FIGS. 6 and 7 illustrate a machine according to the invention in the variant described with reference to FIG. 5 and of which the enclosure is adapted to receive an assembly of moulds 38 mounted between two star-shaped supports 41/42.

In one embodiment, this machine comprises a loading/unloading device incorporating a rotating shaft. In FIG. 6, the enclosure is shown in a substantially horizontal position for loading/unloading. The loading/unloading device is composed of an aerial carriage 59 which moves over a rail 60 disposed above the machine and along its longitudinal axis. The carriage 59 comprise a downwardly extending column 61 bearing at its lower end two spindles 62/63, which are in opposition and extend perpendicularly to column 61. The length of each of the spindles is such that an assembly of moulds 38 may be borne by each of them. The diameter of said spindles is slightly smaller than the diameter of the means 41b/42b in which the spindles are engaged at the moment of loading or of unloading of the enclosure 1. Each spindle 62/63 comprises at its free end a shaft end 62a/63a adapted to penetrate in the housing 43a of the central shaft 43, fixed to the bottom 1b of the enclosure. These spindles 62/63 are mounted on a fork joint 61a, fixed to the lower end of the column 61. The latter comprises, in its upper part, a toothed wheel 64 which meshes for example with an endless screw 65a, fitted on the driven shaft of a gear motor 65 to obtain rotation of the spindles over a semi-circumference for example. The length of the rail 69 is calculated so that the carriage 59 may move on the enclosure 1 side and that the spindle 62 may penetrate in the housing 43a. So as to ensure stability of the rotating assembly when one spindle only, for example the one referenced 63, is loaded, the device comprises a suspension arm 66 borne by a carriage 67, mounted to roll on the rail 60. This carriage 67 is connected to the carriage 59 by two tie-rods 68 located on either side of the rail 60. The suspension arm 66 bears in its lower part a boss 69 comprising a housing 69a adapted to receive the shaft end 62a/63a of the spindles 62/63. Thus mounted, the carriage 67 and the arm 66 follow the displacements controlled by the carriage 59. The assembly of the spindles 62/63 and the load borne by the spindle 63 are balanced by the suspension arm 66.

The machine may comprise a cooling station 70 employing atomization of water, similar to the one described with reference to FIG. 4. This station 70 is borne by a frame 71 of which the flooring 71a lies in the vicinity of the assembly of moulds 38. The lower part of the station 70 comprises a lath floor 70a and therebeneath a receiving tank 70b and a cooling water evacuation 70c. The second phase of cooling by water of an assembly of moulds 38 is effected whilst another assembly of moulds is being heated in the enclosure 1 and takes place after the phase of cooling by air.

The machine further comprises a gantry 72, borne by underframes 72a of which the upper crosspiece is constituted by a rail on which move two carriages bearing pulley blocks 73. These pulley blocks make it possible to support the cover 1c of the enclosure which is preferably in two parts. The covers are opened laterally and on either side of axis yy1 of the enclosure.

A variant of the loading device is illustrated in FIG. 8 of the drawings. This variant is applied to the handling of large-dimensioned moulds and in the case of one single mould 74 being mounted in the enclosure 1.

Such a device comprises at the lower end of the column 61 and in the fork joint 61a, a cylindrical mandrel 75 perpendicular to the column 61 of which the ends 75a/75b are at an equal distance therefrom. At each of said ends, the mandrel 75 comprises radial arms 76/77, all of equal length, comprising at their free end means 78 for fixing the mould 74. Arms 76 and arms 77 diverge slightly in two's from the mandrel 75 with respect to the longitudinal axis of the column and their ends 76a/77a lie in planes which are parallel to one another and to the one in which the axis of column 61 lies.

The mould 74 comprises, in its part which is adapted to come opposite supports 75/76/77, an excess thickness constituted by a sort of hoop which surrounds the mould and which forms a shoulder. The fixing means 78 are for example knuckle joints of which the tightening member 78a is placed in abutment on said shoulder.

The two supports further comprise a centering boss 76b/77b which engages at the moment of positioning of the mould 74 in a tubular member 74b coaxial to the mould. The latter comprises, at its other end, a journal 74c in order to be engaged in the housing 69a of a boss 69 fixed to a suspension arm identical to the one, 66, illustrated in FIGS. 6 and 7.

The parts and members of the machine which have just been described may, without departing from the scope of the invention, be replaced by the man skilled in the art by equivalent parts or members performing the same function.

What is claimed is:

1. A rotational moulding machine comprising a heat-insulated enclosure mounted to rotate on a frame about a substantially horizontal axis, which enclosure comprises means for receiving and driving in rotation at least one mould about an axis perpendicular to the axis of rotation of the enclosure, said enclosure further comprises, inside radiating elements located in front of the walls of the enclosure whose radiations are reflected by reflector means towards the central part of the enclosure where the mould is located in order to heat said mould by radiation.
said at least one mold having locking means for connecting said mold to a support means including a plate, said locking means being actuatable from outside said enclosure by means of a key passed in at least one opening in the bottom of the enclosure.

2. The machine of claim 1, wherein the radiating elements are distributed on the one hand over the height of the enclosure and in front of the inner faces of its lateral walls and on the other hand the radiating elements are distributed in front of the inner faces of its bottom and of its cover.

3. The machine in claim 2, wherein the radiating elements are distributed both over the height and on the inner periphery of the enclosure, which elements are located in planes substantially parallel to one another and perpendicular to the axis of rotation of the mould and the radiating elements are distributed in front of the inner face of the bottom and of the cover in order to occupy the surface defined by the radiating elements which extend on the inner periphery of the enclosure.

4. The machine of claim 3, comprising a plurality of assemblies of radiating elements distributed on the inner periphery of the enclosure, which assemblies are superposed in order to cover the height of the enclosure and each comprise means for controlling the heating in order to modulate the latter over the height of the enclosure.

5. The machine of claim 4, of which the enclosure is mounted to rotate about two parts of hollow shaft whic are coaxial and substantially horizontal, wherein the enclosure is of polygonal cross section and comprises, at its lateral ends where said parts of shaft are located, two boxes defined by the lateral walls of the enclosure and by two reflecting walls parallel to each other and to the axis of rotation of the mould, which walls extend over the height of the location of the mould, comprise a plurality of openings for the passage of air for cooling the mould, which air is admitted cold in one of the boxes by one of said parts of shaft, is distributed over the height of the location of the mould through the perforated wall of said box and is collected in the other box after having passed over the mould, to be evacuated hot by the other part of shaft.

6. The machine of claim 5, wherein the radiating elements are disposed in front of the inner face of the lateral walls of the enclosure and of the cover of the and in front of the faces of the walls having said openings.

7. The machine of claim 6, of which the mould is rotatably mounted on a support means driven in rotation in the lower part of the enclosure, wherein said plate is perforated and is movable in rotation above said radiating elements which are distributed on the bottom of the enclosure.

8. The machine of claim 7, wherein said support means is composed of a plurality of radial arms extending from a central hub mounted to rotate in the bottom of the enclosure, which arms are connected to one another by connecting bars tangential to a theoretical circle concentric to said hub.

9. The machine of claim 8, of which the mould is constituted by two half-shells assembled together, and comprises a bottom by which it rests on the support means.

10. The machine of claim 9, wherein said members are locks of the quarter-turn type, which are composed of a body terminating by an end projecting on the side and are mounted to pivot about axes perpendicular to the bottom of the mould in an arrangement in which said bodies of the locks are placed on one of the sides of the radial arms of the plate and locking is effected when the projecting part is pivoted and positioned below said arms.

11. The machine of claim 6, of which the enclosure is arranged to receive a plurality of moulds equidistant from its centre, wherein the enclosure comprises, in its lower part, shafts passed in orifices reserved in the bottom of the enclosure, which shafts are equidistant from the centre of the enclosure and comprise connecting means for cooperating with means for driving the moulds in rotation, which shafts are subjected to drive means located outside the enclosure.

12. The machine of claim 11, wherein each of the moulds comprises, in its part located towards the bottom of the enclosure and on its longitudinal axis, a female fluted journal, to cooperate with the male fluted end of a shaft and the connection of the shaft and of the mould is effected by means of a rod passed in a conduit coaxial to said shaft and controlled from outside the shaft, which rod is threaded and its end located towards the fluted part of said shaft to screw in a tapping reserved in the bottom of the fluted cavity of the journal and coaxial thereto, said rod comprises at its other end gripping means for rotating it about its axis with a view to screwing or unscrewing it.

13. The machine of claim 12, wherein each of the shafts for driving the moulds comprises a toothed wheel whose toothing cooperates with a central ring mounted to rotate freely, drive being effected by drive means which attack one of said toothed wheels disposed on the periphery of said ring.

14. The machine of claim 13, wherein the moulds comprise at their end opposite the end where the fluted journals are located, other journals coaxial to said fluted journals and comprising a bore in which penetrates a removable shaft, which removable shafts are located in the upper part of the enclosure and extend perpendicularly to the cover thereof.

15. The machine of claim 14, wherein the moulds are mounted between two star-shaped supports of which the radial arms of one support are parallel to the radial arms of the other, and comprise at their free end a circular orifice for receiving a journal and for allowing rotation of the moulds, each of the moulds being borne by two arms, which journals are maintained in translation by means which prevent the supports from escaping the journals.

16. The machine of claim 15, wherein the radial arms of each of the two supports extend from a central hub.

17. The machine of claim 16, comprising loading means comprising an aerial carriage which bears a column extending downwardly in a substantially vertical position and mounted to rotate about its longitudinal axis, at the free end of which are fixed two spindles extending in opposition and perpendicularly to column, which spindles are placed in a position substantially coaxial to the enclosure immobilized in substantially horizontal position, each assembly of moulds being borne by one of said spindles which is engaged in the hubs of the mould supports, and the carriage comprising means for being displaced in the axis of the enclosure thus immobilized in order to place an assembly of moulds in the enclosure or withdraw said assembly therefrom.

18. The machine of claim 10, comprising loading means comprising an aerial carriage which bears a column extending downwardly in a substnatially vertical position and mounted to rotate about its longitudinal axis, at the free end of which are mounted two supports of moulds located on either side of the column, which supports comprise radial arms, which arms of the two supports diverge slightly in two's from a central mandrel with respect to the column and have their free ends located in planes which are parallel to one another and to the column and comprise at said ends means for fixing the mould placed in abutment on a projecting shoulder reserved towards the upper edge of the mould, said supports further comprising means for centering the mould.

19. The machine of claim 18, comprising a suspension arm mounted to roll on the rail of the carriage, of which the free end of the arm is located at the level of the spindles or the central mandrel of the supports and comprises a cylindical housing for receiving a journal coaxial to the hub of one of the supports of an assembly of moulds or a single mould to support the load borne by one of the spindles or one of the supports fixed to the column when the other spindle or the other support is unloaded.

20. The machine of claim 19, comprising a gantry disposed in front of the entrance of the enclosure in horizontal position and perpendicularly to the longitudinal axis thereof, which gantry comprises two pulley blocks guided along its upper crosspiece, which pulley blocks comprise means for hooking the cover of the enclosure which is in two parts in order to retract laterally on either side of the enclosure.

21. The machine of claim 10, comprising unloading means comprising a rail located above the enclosure so that, when it is immobilized in substantially vertical position, the rail extends above the centre of the enclosure, which comprises on either side a station for cooling the moulds by atomization of water and, on this rail, two carriages circulate in reciprocating manner so that, whilst one mould is in cooling phase, another is in heating phase.

22. The machine of claim 21, wherein the loading means comprise a framework which surrounds the enclosure by the top and of which the flooring comprises a trap door for the passage of the moulds and which corresponds to the open end of the enclosure immobilized in substantially vertical position.

23. The machine of claim 22, wherein the carriages comprise means for driving the moulds in rotation about their longitudinal axis to rotate them in front of the water atomization bars fixedly mounted in the cooling stations.

24. The machine of claim 19, comprising, below the rail, in line with enclosure placed in substantially horizontal position and at the spot where the spindle opposite the one which is present in front of the enclosure after its extraction therefrom, is located, a station for cooling the moulds by atomization of water.

* * * * *